United States Patent [19]

Ishii et al.

[11] Patent Number: 5,313,444
[45] Date of Patent: May 17, 1994

[54] EXTERNAL MAGNETIC FIELD GENERATION APPARATUS CAPABLE OF LIGHT INTENSITY MODULATION AND MAGNETIC FIELD MODULATION

[75] Inventors: Mitsuo Ishii, Nabari; Tomoyuki Miyake, Nara, both of Japan

[73] Assignee: Sharp Kabushiki Kaisha, Osaka, Japan

[21] Appl. No.: 969,451

[22] Filed: Oct. 30, 1992

[30] Foreign Application Priority Data

Nov. 18, 1991 [JP] Japan ................................ 3-301838

[51] Int. Cl.⁵ ..................... G11B 11/00; G11B 5/02; G11B 5/17
[52] U.S. Cl. .............................. 369/13; 360/59; 360/123
[58] Field of Search ................ 360/59, 114, 46, 61, 360/123, 66, 113; 369/13, 14; 333/12

[56] References Cited

U.S. PATENT DOCUMENTS

| | | | |
|---|---|---|---|
| 4,862,437 | 8/1989 | Okada | 360/59 X |
| 4,959,820 | 9/1990 | Horimai et al. | 360/59 X |
| 4,972,395 | 11/1990 | Baba | 360/59 X |
| 4,998,231 | 3/1991 | Watanabe et al. | 360/59 X |
| 5,072,432 | 12/1991 | Tanaka | 360/59 X |
| 5,077,714 | 12/1991 | Katayama et al | 369/13 |

FOREIGN PATENT DOCUMENTS

| | | |
|---|---|---|
| 0439323 | 7/1991 | European Pat. Off. . |
| 3-216836 | 5/1991 | Japan . |
| 3-268253 | 6/1991 | Japan . |

OTHER PUBLICATIONS

Patent Abstracts of Japan, vol. 16, No. 5, 8 Jan. 1992 & JP-A-32 28 201 (Kyocera Corp.) Oct. 1991 & Abstract.
Patent Abstracts of Japan, vol. 14, No. 98, 22 Feb. 1990 & JP-A-13 03 606 (Matsushita Electric Ind. Co.), 7 Dec. 1989 & Abstract.
Patent Abstracts of Japan, vol. 13, No. 54, 8 Feb. 1989, & JP-A-63 244 402 (Sony Corp.) 11 Oct. 1988 & Abstract.
Patent Abstracts of Japan, vol. 12, No. 331, 7 Sep. 1988 & JP-A-63 094 406 (Sony Corp.) 25 Apr. 1988 & Abstract.
EPO Search Report.

*Primary Examiner*—John Shepperd
*Assistant Examiner*—Patrick Wamsley
*Attorney, Agent, or Firm*—Nixon & Vanderhye

[57] ABSTRACT

An external magnetic field generation apparatus is used for a recording and reproduction apparatus which records information on a magneto-optical recording medium based on the magnetic field modulation system and the light modulation system, and applies a magnetic field to the portion of the magneto-optical recording medium where the light beam is projected. The apparatus has the first electro-magnet, used for the magnetic field modulation system, for generating an a.c. magnetic field which is reversed at a high speed. The apparatus has the second electro-magnet, used for the light modulation system, for generating a strong d.c. magnetic field such that power consumption coincides with that of the first electro-magnet.

The second electro-magnet is integral with the first electro-magnet. The apparatus has a driver for selecting one of the electro-magnets in response to a switching signal, and the driver supplies power to the selected electro-magnet.

14 Claims, 3 Drawing Sheets

EXTERNAL MAGNETIC FIELD GENERATION APPARATUS CAPABLE OF LIGHT INTENSITY MODULATION AND MAGNETIC FIELD MODULATION

FIELD OF THE INVENTION

The present invention relates to an external magnetic field generation apparatus for use in a magneto-optical recording and reproduction apparatus which records, reproduces, or erases information on or from a magneto-optical recording medium such as a magneto-optical disk.

BACKGROUND OF THE INVENTION

Information is recorded on a magneto-optical recording medium as follows. Namely, a light beam is converged on the magneto-optical recording medium, so as to become a light spot, having a diameter of about 1 micron. As a result, the temperature of the portion of the magneto-optical recording medium on which the light spot is located, rises to a Curie point, thereby decreasing a coercive force of the portion. After that, a magnetic field is applied to the portion where the coercive force is decreased. A magnetization direction of the portion where the light spot is oriented according to the applied magnetic field and the recording of information thus performed.

There are two kinds of systems for recording information like the above i.e., the light modulation system and the magnetic field modulation system.

According to the light modulation system, information is recorded in the following manner: (1) erasure is performed by applying a magnetic field having a predetermined direction to the magneto-optical recording medium, this initialization operation causes all the recording area to have the same magnetization direction as the applied magnetic field, and thereafter (2) information is recorded, by applying a magnetic field having the opposite direction to the portion, while changing an intensity of laser light according to desired recording information, thereby forming a predetermined recording bit on the magneto-optical recording medium. In contrast, according to the magnetic field modulation system, information is recorded in the following manner: a modulated magnetic field is applied to a portion of the magneto-optical recording medium where information is to be recorded, a direction of the modulated magnetic field is changed to the opposite direction in response to recording information, thereby forming a predetermined recording bit on the magneto-optical recording medium.

A magnetic head for use in the light modulation system is required to generate a strong d.c. magnetic field from an N-pole and a S-pole of a magnet since, using the strong d.c. magnetic field from the N-pole and S-pole, information should be recorded twice on the same track for accuracy while tracing the desired track. Accordingly, a magneto-optical recording medium for use in the light modulation system which has a magnetic field between 200 Oe and 300 Oe, during recording is available in the market.

In contrast, a magnetic head for use in the magnetic field modulation systems is required to switch a modulated magnetic field at a high speed, i.e., in a short cycle on the order of 10 ns. The magnetic head is thus designed to have a low inductance. The magneto-optical recording medium for use in the magnetic field modulation system is, therefore, improved in the sensitivity for magnetic field in order to be able to record information with a magnetic field of about 150 Oe, since the magnetic head having the low inductance can generate a low magnetic field of 100 Oe to 200 Oe.

As discussed above, the functions required for the respective systems, i.e., a strong d.c. magnetic field for the light modulation system and switching the modulated magnetic field at a high speed for the magnetic field modulation system, conflict with each other. Namely, the magnetic head for use in the magnetic field modulation system cannot record information on the magneto-optical recording medium for use in the light modulation system because the intensity of the generated magnetic field from this head is too weak to record. Further, the magnetic head for use in the light modulation system cannot record information on the magneto-optical recording medium for use in the magnetic field modulation system because this head cannot reverse the modulated magnetic field at such a high speed.

As discussed above, the magnetic head for one system cannot record information on the magneto-optical recording medium used for the other system. Therefore, two kinds of magnetic heads should be prepared in a single recording and reproduction apparatus in order that the single apparatus can record information based on the respective systems such an apparatus becomes massive.

In order to solve this problem external magnetic generation apparatuses which have respective complexed magnetic heads including both a magnetic head capable of generating a strong d.c. magnetic field and a magnetic head capable of switching a modulated magnetic field at a high speed, both magnetic heads being integrated with each other, are disclosed in the Japanese unexamined patent publications No. 3-216836 and No. 3-268253. With this arrangement, the apparatus is not so massive.

However, in the respective external magnetic generation apparatuses disclosed in the publications, the magnetic heads of the complexed magnetic head differ in their power consumptions. Accordingly, the external magnetic generation apparatus is required to have two drivers, i.e., one is for the magnetic field modulation system and the other is for the light modulation system, for supplying power to the corresponding magnetic head. Namely, two drivers are required for a single apparatus, thereby making it impossible for the apparatus to be smaller although the apparatus is required to be more compact.

SUMMARY OF THE INVENTION

It is an object of the present invention to provide an external magnetic field generation apparatus which can further miniaturize a recording and reproduction apparatus based on the fact that a single driver drives a complex magnetic head.

In order to achieve the foregoing object, the present invention is characterized by comprising:

first magnetic field generation means for generating an a.c. magnetic field which is reversed at a high speed, the first magnetic field generation means being used for a magnetic field modulation system;

second magnetic field generation means for generating a strong d.c. magnetic field such that power consumption coincides with that of the first magnetic field generation means, the second magnetic field generation means being integral with the first magnetic field generation means, the second magnetic field generation means being used for a light modulation system; and power supply means for selecting one of the first magnetic field generation means and the second magnetic field generation means in response to a switching signal, and for supplying power to the selected magnetic field generation means.

With the arrangement, it is not necessary to have two power supply means, i.e., power supply means associated with the magnetic field modulation system and another power supply means associated with the light modulation system. This is based on the fact that power consumption of the first magnetic field generation means coincides with that of the second magnetic field generation means. Accordingly, a single power supply means can be used for recording of information based on the two systems in accordance with the present external magnetic field generation apparatus, thereby more miniaturizing the apparatus than the case where the two power supply means corresponding to the respective modulation systems are provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

BRIEF DESCRIPTION OF THE DRAWINGS

FIGS. 1 through 4 show one embodiment of the present invention wherein:

FIG. 1 is a schematic explanatory diagram showing the structure of a magnetic head of the present invention;

FIG. 2 is a schematic explanatory diagram showing the structure of a magneto-optical recording and reproduction apparatus of the present invention;

FIG. 3 is a block diagram showing the configuration of a driver of the present invention.

DESCRIPTION OF THE EMBODIMENTS

The following description describes one embodiment of the present invention with reference to FIGS. 1 through 4.

Figure 2:
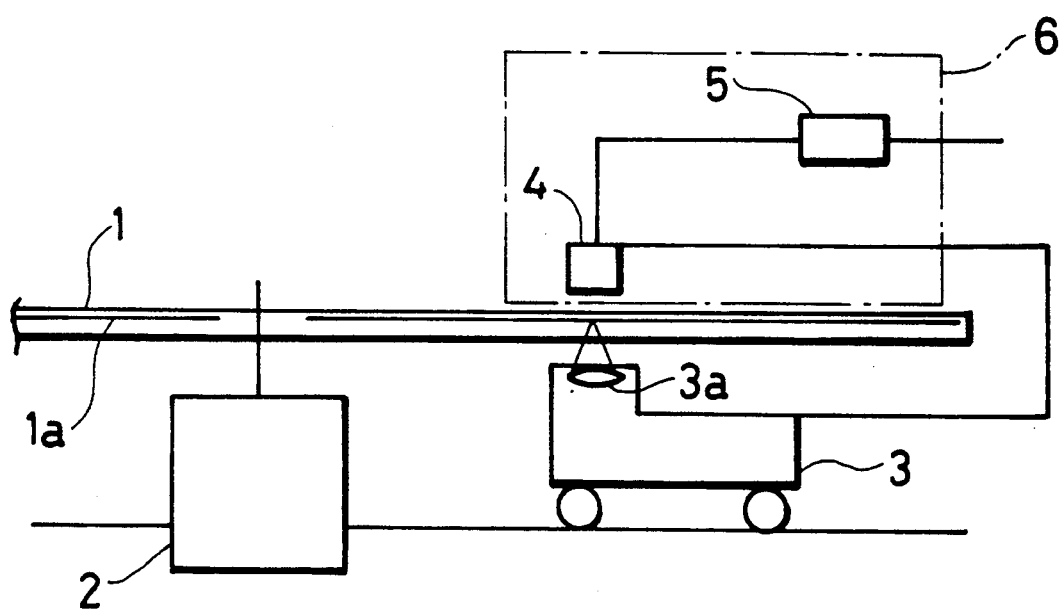

A magneto-optical recording and reproduction apparatus of the present embodiment, as shown in FIG. 2 for example, has (a) a motor 2 for rotating a magneto-optical disk 1 containing therein a magneto-optical recording layer 1a, (b) an optical pickup 3 for projecting a light beam onto the magneto-optical disk 1, and (c) an external magnetic field generation apparatus 6 for applying a magnetic field to the magneto-optical disk 1. The external magnetic field generation apparatus 6 is composed of (a) a complex magnetic head 4 which is opposite to the optical pickup 3 through the magneto-optical disk 1 and (b) a driver 5, connected to the complex magnetic head 4, for supplying power to the complex magnetic head 4. The optical pickup 3 is integral with the complex magnetic head 4 and moves to a radial direction of the magneto-optical disk 1.

The optical pickup 3 has (a) an objective lens 3a for converging a light beam to the magneto-optical disk 1 and (b) an actuator (not shown) for moving the objective lens 3a in two axes. The actuator is arranged such that the objective lens 3a converges the light beam to a desired track of the magneto-optical disk 1 based on a servo control.

The complex magnetic head 4 is mounted on a floating slider (not shown) for example and is arranged such that a magnetic field is applied to the portion where the light beam is converged. During application of the magnetic field, a distance between the magneto-optical disk 1 and the complex magnetic head 4 is kept substantially constant.

Figure 3:
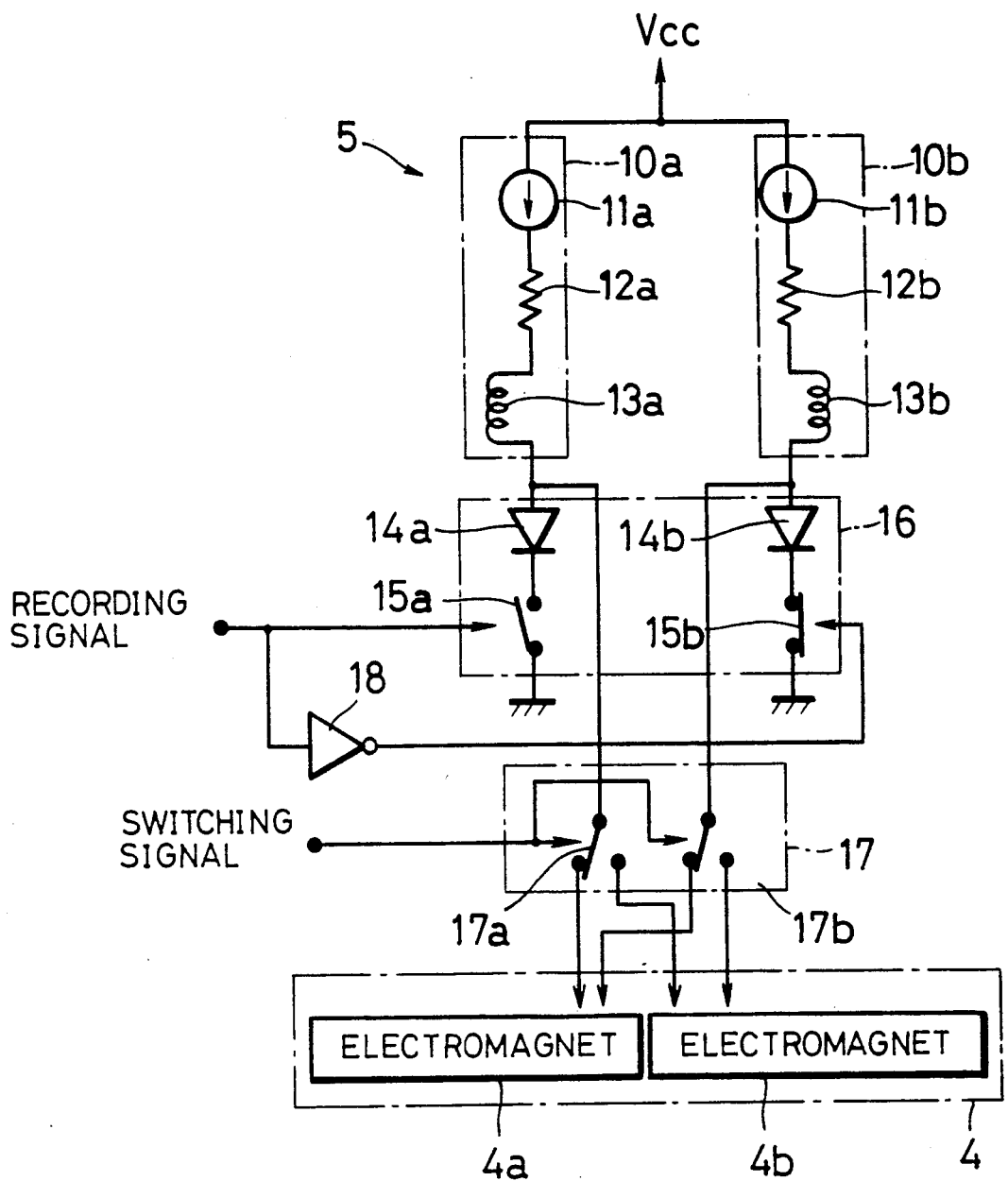

The driver 5 (power supply means) which supplies power to the complex magnetic head 4, as shown in FIG. 3, has (a) a pair of current output means, i.e., a first current output section 10a and a second current output section 10b, which are connected to a voltage source $V_{cc}$, (b) a current output switching section 16 (current output switching means) to which a recording signal is inputted, and (c) a magnet switching section 17 (magnet switching means) to which a switching signal is inputted.

The first current output section 10a has a current source 11a, a resistor 12a, and a coil 13a. The second current output section 10b has a current source 11b, a resistor 12b, and a coil 13b. The current output switching section 16 has diodes 14a, 14b, and switches 15a, 15b which are switched in response to the recording signal. The diode 14a is connected to the first current output section 10a and is also connected to the ground through the switch 15a. The diode 14b is connected to the first current output section 10b and is also connected to the ground through the switch 15b. The recording signal is inputted to the switch 15a as a control signal for switching thereof, while the inverted recording signal by a inverter 18 (current output switching means) is inputted to the switch 15b as a control signal for switching thereof.

The first and second current output sections 10a and 10b are respectively connected to the magnet switching section 17. The magnet switching section 17 has a pair of switches 17a and 17b by which the first and second current output sections 10a and 10b are connected from an electro-magnet 4a (first magnetic field generation means) to an electro-magnet 4b (second magnetic field generation means) or vice versa according to a switching signal. A common terminal of the switch 17a is connected to a connecting point between the coil 13a and the diode 14a. A common terminal of the switch 17b is connected to a connecting point between the coil 13b and the diode 14b. With the arrangement, a current is supplied to one of the common terminals of the switches 17a and 17b from one of the first and second current output sections 10a and 10b according to the recording signal and the inverted recording signal, and the other common terminal of the switches 17a and 17b is connected to the ground.

One of the output terminals of the switch 17a and a corresponding output terminal of the switch 17b are respectively connected to ends of a lead wire of the electro-magnet 4a (used for the light modulation system) of the complex magnetic head 4. The other output terminals of the switch 17a and the switch 17b are respectively connected to ends of a lead wire of the electro-magnet 4b (used for the magnetic field modulation system) of the complex magnetic head 4. With the arrangement, the magnet switching section 17 can select the electro-magnet 4a for the light modulation system or electro-magnet 4b for the magnetic field modulation system in accordance with the switching signal.

Accordingly, the driver 5 can apply a modulated magnetic field having a direction in accordance with the recording signal to the recording portion of the magneto-optical recording layer 1a when the electro-magnet 4a is selected in response to the switching signal and when the recording signal is arranged so as to correspond to the information to be recorded on the magneto-optical disk 1, thereby enabling recordation of information based on the magnetic field modulation system. It is also possible to record information based on the light modulation system when the electro-magnet 4b is selected in response to the switching signal and the driver 5 reverses the magnetic field according to the recording signal.

The driver 5 defined as above is arranged such that a signal associated with the recording signal is amplified and a current of hundreds of milliamperes (mA) is outputted. Driver 5 is also arranged such that an output current is reversed within tens of nanoseconds (ns) when the electro-magnet 4b has an inductance of a few microhenries ($\mu$H). The driver 5 is further arranged so as to output substantially the same amplitude of current. This is based on the fact that the driver 5 has a frequency characteristic over the wide-band from d.c. frequency to the modulated frequency. Namely, tens of microseconds ($\mu$s) are required as the rise time of the output current since the frequency band of the output current is likely to decrease in proportion to the increase of the inductance of the electro-magnet 4b. In contrast, the current in the range of d.c. frequency is not changed in its amplitude.

Figure 1:
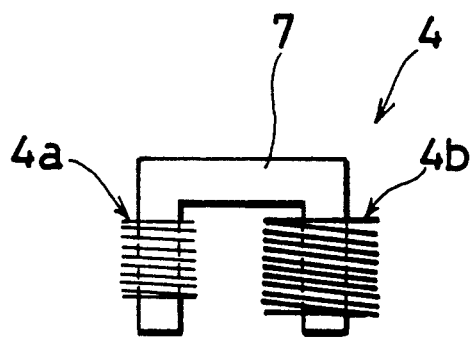

The complex magnetic head 4 which is connected to the driver 5, as shown in FIG. 1, has both the electro-magnet 4a for the magnetic field modulation system and the electro-magnet 4b for the light modulation system, wherein the electro-magnet 4a is designed to consume the same power as the electro-magnet 4b. The complex magnetic head 4 has an U-shaped magnetic core 7 of high permeability which is made of Mn-Zn ferrite for example, and is arranged such that lead wires are wound around respective ends of the magnetic core 7, thereby defining the respective electro-magnets 4a and 4b. Note that the lead wire associated with the electro-magnet 4b is designed so as to have the same resistance as the lead wire associated with the electro-magnet 4a by adjusting the respective wire lengths and the respective wire diameters.

In particular, the electro-magnet 4a is defined by winding 20 turns around one end of the magnetic core 7 with a lead wire having a diameter of 70 microns ($\mu$m). The electro-magnet 4b is defined by winding 32 turns around the other end of the magnetic core 7 with a lead wire having a diameter of 90 microns ($\mu$m), thereby coinciding with the resistance of the electro-magnet 4a.

The electro-magnet 4a defined by 20 turns of the lead wire having a diameter of 70 microns ($\mu$m) has inductance $L_1$ of 2 $\mu$H. The electro-magnet 4b defined by 32 turns of the lead wire having a diameter of 90 microns ($\mu$m) has inductance $L_2$ of 5 $\mu$H. Inductance $L_2$ is 2.5 times as large as inductance $L_1$ though both resistances are equal with each other.

When recording information on the magneto-optical disk 1 is performed based on the magnetic field modulation system by using the magneto-optical recording and reproduction apparatus having the above-mentioned external magnetic field generation apparatus, the electro-magnet 4a is first connected to the driver 5 in response to the switching signal. Then, the light beam having a constant intensity is projected onto the magneto-optical disk 1 from the optical pickup 3 and the magnetic field from the electro-magnet 4a is reversed according to the recording signal, thereby performing the recording of information. At this time, the driver 5 can drive a reversed current of $\pm 200$ mA in a period of 20 ns within the frequency range of about 10 MHz, and the complex magnetic head 4 can generate $\pm 160$ Oe.

In contrast, when recording information on the magneto-optical disk 1 is performed based on the light modulation system, the electro-magnet 4b is connected to the driver 5. Then, the electro-magnet 4b applies a constant magnetic field to the magneto-optical disk 1 while changing the intensity of the light beam in accordance with the recording signal, thereby performing the recording of information. At this time, the electro-magnet 4b can generate a d.c. magnetic field of $\pm 250$ Oe for example according to the current of $\pm 200$ mA from the driver 5, and the rise time of the magnetic field from 0 Oe to $\pm 250$ Oe can be about tens of $\mu$s.

With the arrangement, the current outputted from a single driving source (driver 5) to the electro-magnets 4a and 4b, is switched by the magnet switching section 17, and the current is applied to either the electro-magnet 4b or the electro-magnet 4a, since the power consumption of the electro-magnet 4a is equal to that of the electro-magnet 4b and one of the electro-magnets 4a and 4b can be selected according to the usage by only supplying the switching signal to the magnet switching section 17.

When reproduction of the recorded information from the magneto-optical disk 1 using the magneto-optical recording and reproduction apparatus, a light beam of low intensity from the optical pickup 3 is projected onto the magneto-optical disk 1. Reproduction is performed based on the reflected light beam from the magneto-optical disk 1 by using the magneto-optical effect.

Figure 4A:
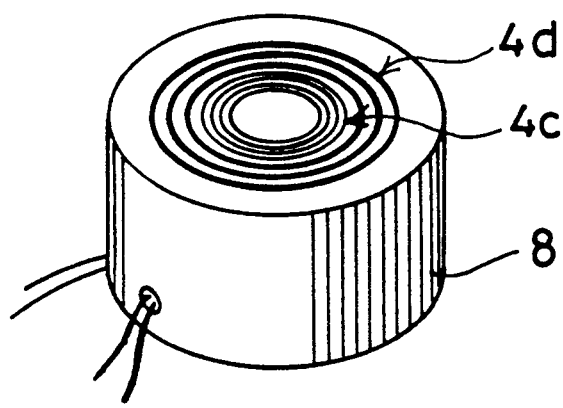
FIG. 4(a) and 4(b) are explanatory diagrams showing the structure of another magnetic head of the present invention.
Figure 4B:
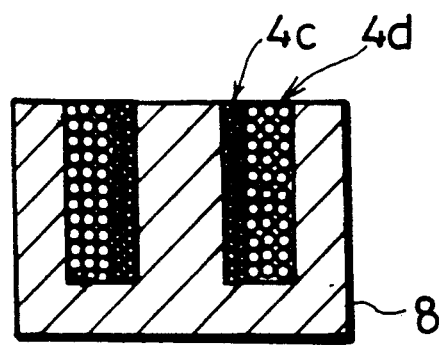

The complex magnetic head 4, as shown in FIG. 4, is preferably arranged such that a magnetic core 8 is wound with a lead wire having a diameter of 70 $\mu$m to define an inner electro-magnet, i.e., an electro-magnet 4c and this magnetic core 8 is further wound with a lead wire having a diameter of 90 $\mu$m to define an outer electro-magnet, i.e., an electro-magnet 4d. Note that the magnetic core 8 is formed around the electro-magnet 4d.

In addition, the magnetic field can be changed by adjusting the winding turns of the lead wire in accordance with the embodiment, but the magnetic field can also be changed by controlling the driver 5 such that the driving current of the driver 5 changes in its amplitude.

The external magnetic field generation apparatus of the present invention, as mentioned above, is used for a recording and reproduction apparatus which records information on a magneto-optical recording layer 1a based on the magnetic field modulation system and the light modulation system, and applies a magnetic field to the portion of the magneto-optical recording layer 1a where the light beam is projected, the apparatus being characterized by comprising:

the electro-magnet 4a (first magnetic field generation means) for generating an a.c. magnetic field which is reversed at a high speed, the electro-magnet 4a being used for a magnetic field modulation system;

the electro-magnet 4b (second magnetic field generation means) for generating a strong d.c. magnetic field such that power consumption coincides with that of the electro-magnet 4a, the electro-magnet 4b being integral with the electro-magnet 4a, the electro-magnet 4b being used for a light modulation system; and the driver 5 (power supply means) for selecting one of said the electro-magnet 4a and the electro-magnet 4b in response to a switching signal, and for supplying power to the selected electro-magnet.

Accordingly, it is not necessary to have two drivers for supplying power to the respective electro-magnets 4a and 4b, i.e., one driver associated with the magnetic field modulation system and the other driver associated with the light modulation system. This is based on the fact that power consumption of the electro-magnet 4a coincides with that of the electro-magnets 4b. Accordingly, a single power supply means can be used for recording information based on the two systems in accordance with the present external magnetic field generation apparatus, thereby miniaturizing the driver more than the case where the two drivers corresponding to the respective modulation systems are provided. The present recording and reproduction apparatus, thus, can be miniaturized as a whole.

There are described above, novel features which the skilled man will appreciate give rise to advantages. These are each independent aspects of the invention to be covered by the present application, irrespective of whether or not they are included within the scope of the following claims.

What is claimed is:

1. An external magnetic field generation apparatus for use in a recording and reproduction apparatus which records information on a magneto-optical recording medium based on a magnetic field modulation system and a light modulation system, and said apparatus applying a magnetic field to a portion of the magneto-optical recording medium where the light beam is projected, comprising:

first magnetic field generation means for generating an a.c. magnetic field which is reversed at a high speed, said first magnetic field generation means being used for the magnetic field modulation system;

second magnetic field generation means for generating a strong d.c. magnetic field such that power consumption coincides with that of said first magnetic field generation means, said second magnetic field generation means being integral with said first magnetic field generation means, said second magnetic field generation means being used for the light modulation system; and power supply means for selecting one of said first magnetic field generation means and said second magnetic field generation means responsive to a switching signal, and for supplying power to said selected magnetic field generation means.

2. The external magnetic field generation apparatus as set forth in claim 1, wherein said first and second magnetic field generation means are defined by winding around a magnetic core member of high permeability with first and second lead wires, and said first lead wire associated with said first magnetic field generation means has the same resistance as said second lead wire associated with said second magnetic field generation means by adjusting the respective wire lengths and wire diameters.

3. The external magnetic field generation apparatus as set forth in claim 2, wherein said first magnetic field generation means is defined by winding around one end of said magnetic core with said first lead wire, and said second magnetic field generation means is defined by winding around the other end of said magnetic core with said second lead wire.

4. The external magnetic field generation apparatus as set forth in claim 1, wherein said first magnetic field generation means is defined by winding a magnetic core with a first lead wire, and said wound magnetic core is further wound with a second lead wire.

5. The external magnetic field generation apparatus as set forth in claim 2, wherein said magnetic core is made of Mn-Zn ferrite.

6. The external magnetic field generation apparatus as set forth in claim 2, wherein said power supply means includes:

first and second current output means, connected to a voltage source, for outputting predetermined currents respectively;

current output switching means for permitting one of said pair of current output means to output the predetermined current while connecting the other current output means to a ground in response to a recording signal; and magnet switching means for selecting one of said first and second magnetic field generation means in response to a switching signal, and for connecting ends of the lead wire of said selected magnetic field generation means to respective outputs of said pair of current output means.

7. The external magnetic field generation apparatus as set forth in claim 6, wherein said each current output means includes a current source, a resistor, and a coil, these elements being connected in series.

8. The external magnetic field generation apparatus as set forth in claim 7, wherein said current output switching means includes:

first and second diodes connected to said respective first and second current output means;

first switch, which is opened or closed in response to the recording signal, for guiding said first current output means to a ground through said first diode during closing;

an inverter circuit means for outputting an reversed recording signal upon reception of the recording signal to said second switch; and second switch, which is opened or closed in response to the inverted recording signal, for guiding said second current output means to the ground through said second diode during closing.

9. The external magnetic field generation apparatus as set forth in claim 8, wherein said magnet switching means includes third and fourth switches for switching in response to the switching signal, each switch having first and second output terminals, a common terminal of said third switch being connected to a connecting point between said first current output means and said first current output switching means while a common terminal of said fourth switch being connected to a connecting point between said second current output means and said second current output switching means, and said respective first output terminals of said third and fourth switches being connected to said first magnetic field generation means while said respective second output terminals of said third and fourth switches being connected to said second magnetic field generation means.

10. An external magnetic field generation apparatus for use in a recording and reproduction apparatus which records information on a magneto-optical recording medium, the apparatus comprising a first winding wire and a second winding wire wound about differing ends of a common magnetic core to form a first magnetic field generation means and a second magnetic field generation means, respective lengths and diameters of the first winding wire and the second winding wire being chosen so that the first winding wire and the second winding wire have the same electrical resistance.

11. The external magnetic field generation apparatus of claim 10, further comprising a power supply means for selecting one of the first magnetic field generation means and the second magnetic field generation means in response to a switching signal, and for supplying power to the selected magnetic field generation means.

12. The external magnetic field generation apparatus of claim 10, wherein the first magnetic field generation means is used for magnetic field modulation.

13. The external magnetic field generation apparatus of claim 10, wherein the second magnetic field generation means is used for light modulation.

14. The external magnetic field generation apparatus of claim 10, wherein the first magnetic field generation means and the second field generation means have substantially the same power consumption.

* * * * *